(12) United States Patent
Kim

(10) Patent No.: US 6,560,373 B1
(45) Date of Patent: *May 6, 2003

(54) APPARATUS AND METHOD OF COMPRESSING STILL IMAGE AT REGULAR COMPRESSION RATE

(75) Inventor: Kyoung-ho Kim, Kunpo (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 26 days.

(21) Appl. No.: 08/985,176

(22) Filed: Dec. 4, 1997

(30) Foreign Application Priority Data

Dec. 4, 1996 (KR) ............................................ 96/61664

(51) Int. Cl.[7] .................................................. G06K 9/46
(52) U.S. Cl. ...................... 382/251; 382/246; 382/250; 358/432
(58) Field of Search ................................. 382/250, 251, 382/248, 166, 232, 239; 348/395, 409–415, 403–408; 358/432–433; 375/240.3, 240.18, 240.2, 240.23

(56) References Cited

U.S. PATENT DOCUMENTS

| | | | | |
|---|---|---|---|---|
| 5,109,451 A | * | 4/1992 | Aono et al. ................... | 382/166 |
| 5,301,242 A | * | 4/1994 | Gonzales et al. ............ | 382/239 |
| 5,629,780 A | | 5/1997 | Watson ........................ | 358/432 |

OTHER PUBLICATIONS

Digital Image Processing, by Baxes, Gregory, A., printed by John Wiley & Sons, Inc., copyright 1994, pp. 193–196, 213–215, and 398, Jan. 1, 1994.*

* cited by examiner

Primary Examiner—Leo Boudreau
Assistant Examiner—Ishrat Sherali
(74) Attorney, Agent, or Firm—Robert E. Bushnell, Esq.

(57) ABSTRACT

A still image compressing apparatus which constantly maintains the compression rate, and a method therefor are provided The still image compressing apparatus which constantly maintains a compression rate, comprises a luminance and chrominance signal generator which receives R, G and B signals of a still image and generates luminance and chrominance signals, a discrete cosine transformer which divides the image, represented by the luminance and chrominance signals, into square areas of a predetermined size, and decomposes each square area into coefficients for all the frequencies ranging from a mean value to a maximum frequency image component, a regular compression rate quantizer which divides each coefficient by a predetermined quantization step size, where coefficients corresponding to frequencies higher than a reference frequency are divided by the maximum possible step size, and an entropy decoder having a code scheme, which allots short-length codes to values having a high probability of occurrence among the quantized coefficients, and long-length codes to values having a low probability of occurrence among the quantized coefficients. Accordingly, a compression rate is consistent even though the content of an input still image varies. Therefore, in an apparatus in which image quality is of less importance than predictable processing time, the time for compressing or decompressing a still image can be predicted.

20 Claims, 2 Drawing Sheets

APPARATUS AND METHOD OF COMPRESSING STILL IMAGE AT REGULAR COMPRESSION RATE

CLAIM OF PRIORITY

This application makes reference to, incorporates the same herein, and claims all benefits accruing under 35 U.S.C §119 from an application entitled earlier filed in the Korean Industrial Property Office on Dec. 4, 1996, and there duly assigned Serial No. 96-61664 by that Office.

BACKGROUND OF THE INVENTION

1. Field of the Invention

The present invention relates to a still image compressing apparatus, and more particularly, to a still image compressing apparatus which can constantly maintain the compression rate of still images to within a predetermined range, and a method thereof.

2. Description of Related Art

Multimedia information is mainly comprised of a picture and sound. However, when this information is processed by pulse code modulation (PCM), the amount of data is excessive, which causes troubles in storage and transmission of the data. Accordingly, one of the prerequisites of multimedia is a technique of effectively compressing pictures and sounds. Thus, an international standard has been set to govern compression and multiplexing of pictures and sounds. In particular, JPEG (Joint Photographic Experts Group) is a standard developed for still image processing, such as in computer graphics.

A still image compressing apparatus based on JPEG has a discrete cosine transformer (DCT), a quantizer and an entropy encoder as basic components. The corresponding JPEG still image decoding apparatus includes an entropy decoder, a dequantizer and a reverse DCT as basic components. U.S. Pat. No. 5,629,780 to Andrew B. Watson, entitled Image Data Compression Having Minimum Perceptual Error, describes such a still image compressing apparatus and is incorporated herein by reference.

Typically, after discrete cosine transformation, the values of pixels irregularly distributed on a screen before transformation are likely to be concentrated toward the low frequency coefficients. Therefore, the compression of information can be performed with little noticeable loss of information by discarding the high frequency coefficients. One way of achieving this is quantization. Quantization is a process of dividing respective coefficients corresponding to each discrete-cosine transformed frequency by a predetermined quantization step size. Many terms become zero with an increase in quantization step size, and thus many high frequency terms are lost but the compression rate increases. In the decoding process, dequantization is performed by multiplying an entropy decoded image signal by the quantization step size.

In the still image compressing apparatus based on JPEG, a quantization step size used in the above-described quantization or dequantization process is provided in the form of the following standard table.

TABLE 1

Quantization table for luminance signals

| 16 | 11 | 10 | 16 | 24 | 40 | 51 | 61 |
|---|---|---|---|---|---|---|---|
| 12 | 12 | 14 | 19 | 26 | 58 | 60 | 66 |
| 14 | 13 | 16 | 24 | 40 | 57 | 69 | 57 |
| 14 | 17 | 22 | 29 | 51 | 87 | 80 | 62 |
| 18 | 22 | 37 | 56 | 68 | 109 | 103 | 77 |
| 24 | 36 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

TABLE 2

Quantization table for chrominance signals.

| 17 | 18 | 24 | 47 | 99 | 99 | 99 | 99 |
|---|---|---|---|---|---|---|---|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

Typically, if there are many coefficients respectively corresponding to each discrete cosine transformed frequency having a high frequency component, the high frequency component increases and the compression rate is deteriorated, even after quantization by the quantization step size suggested by the quantization table. That is, when the quantization tables are used, the image quality is improved but the compression rate of a still image having many high-frequency components is lowered, and the compression rate of a still image having few high-frequency components is increased. Thus, the compression rate varies greatly according to the frequency components of the still image.

As described above, the compression rate of a still image by the JPEG method has a wide variation depending on the content of the still image. Therefore, the time needed to record, reproduce or transmit the still image varies greatly according to the content of the image to be compressed.

SUMMARY OF THE INVENTION

To solve the above problem, it is an object of the present invention to provide an apparatus for compressing a still image at a regular compression rate, which minimizes the variation of the compression rate by controlling high frequency components of a quantization table, and a method therefor.

To accomplish the above object, there is provided a still image compressing apparatus which constantly maintains a compression rate, the apparatus comprising: a luminance and chrominance signal generator which receives R, G and B signals of a still image and generates luminance and chrominance signals; a discrete cosine transformer which divides the image, represented by the luminance and chrominance signals, into square areas of a predetermined size, and decomposes each square area into coefficients for all the frequencies ranging from a mean value to a maximum frequency image component; a regular compression rate quantizer which divides each coefficient by a predetermined quantization step size, where coefficients corresponding to frequencies higher than a reference frequency are divided by the maximum possible step size; and an entropy decoder having a code scheme of allotting short-length codes to values having a high probability of occurrence among the quantized coefficients, and long-length codes to values having a low probability of occurrence among the quantized coefficients.

Also, to accomplish the above object, there is provided a method of constantly maintaining a compression rate, comprising the steps of: receiving R, G and B signals of a still image and generating luminance and chrominance signals; dividing the image, represented by the luminance and chrominance signals, into square areas of a predetermined size; discrete-cosine transforming each square area into coefficients for all the frequencies ranging from a mean frequency value to a maximum frequency value; dividing each coefficient by a predetermined quantization step size, where the maximum possible step size is used for coefficients corresponding to frequencies higher than a reference frequency; and allotting short-length codes to values having a high probability of occurrence among the quantized coefficients, and long-length codes to values having a low probability of occurrence among the quantized coefficients.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
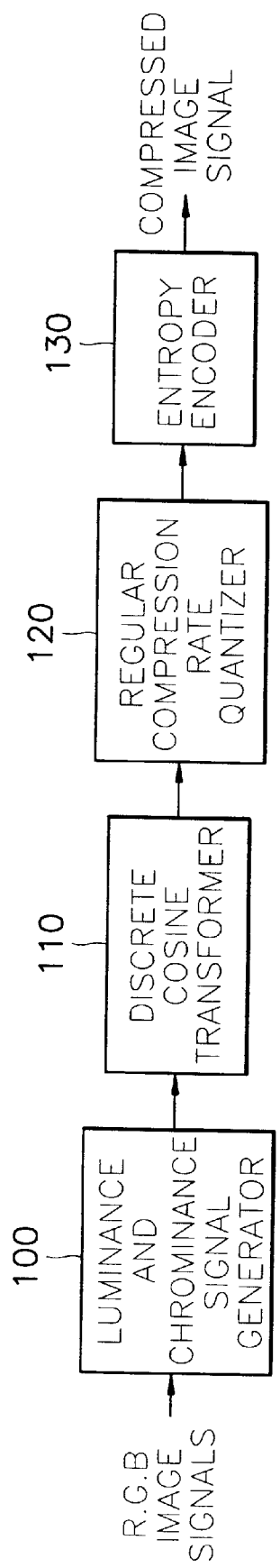
FIG. 1 is a block diagram of an apparatus for compressing a still image at a regular compression rate according to the present invention.

Referring to FIG. 1, an apparatus for compressing a still image at a regular compression rate according to the present invention is comprised of a luminance and chrominance signal generator 100, a discrete cosine transformer 110, a regular compression rate quantizer 120 and an entropy encoder 130. The luminance and chrominance signal generator 100 generates a luminance signal and chrominance signals Cr and Cb from R, G and B image signals extracted from a still image. The discrete cosine transformer 110 divides the image into square areas of a predetermined size and transforms each of the square areas into coefficients for all the frequencies ranging from a mean value of the frequency (direct current component) to a maximum value of the frequency. Such a decomposition process is called an orthogonal transformation, and the advantage is that the information (e.g., luminance) representing pixels irregularly distributed on a screen before the transformation is likely to be concentrated on a low frequency coefficient after the transformation. The regular compression rate quantizer 120, as the core unit of the present invention, divides the discrete-cosine-transformed frequency coefficients by a predetermined quantization step size, but divides coefficients corresponding to frequencies higher than a predetermined reference frequency by a maximum among all possible quantization step sizes. The value of the reference frequency varies with a range of the compression rate, which is desired to be constantly maintained. That is, as the reference frequency lowers, the variation of the compression rate decreases but loss of the image quality increases. Also, as the reference frequency becomes higher, the variation width of the compression rate increases but the loss of the image signal decreases. The possible maximum value of the quantization step size is 255. Hereinbelow, a quantization table as an embodiment of the present invention is shown.

TABLE 3

Quantization table for luminance signals as an embodiment of the present invention

| 16 | 11 | 10 | 16 | 255 | 255 | 255 | 255 |
| 12 | 12 | 14 | 255 | 255 | 255 | 255 | 255 |
| 14 | 13 | 255 | 255 | 255 | 255 | 255 | 255 |
| 14 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

TABLE 4

Quantization table for chrominance signals as an embodiment of the present invention

| 17 | 18 | 24 | 47 | 255 | 255 | 255 | 255 |
| 18 | 21 | 26 | 255 | 255 | 255 | 255 | 255 |
| 24 | 26 | 255 | 255 | 255 | 255 | 255 | 255 |
| 47 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

The entropy encoder 130 uses an encoding scheme of allotting a short-length code to a value having a high probability of occurrence among the quantized coefficients, and a long-length code to a value having a low possibility of occurrence, in order to compress the image signal.

Figure 2:
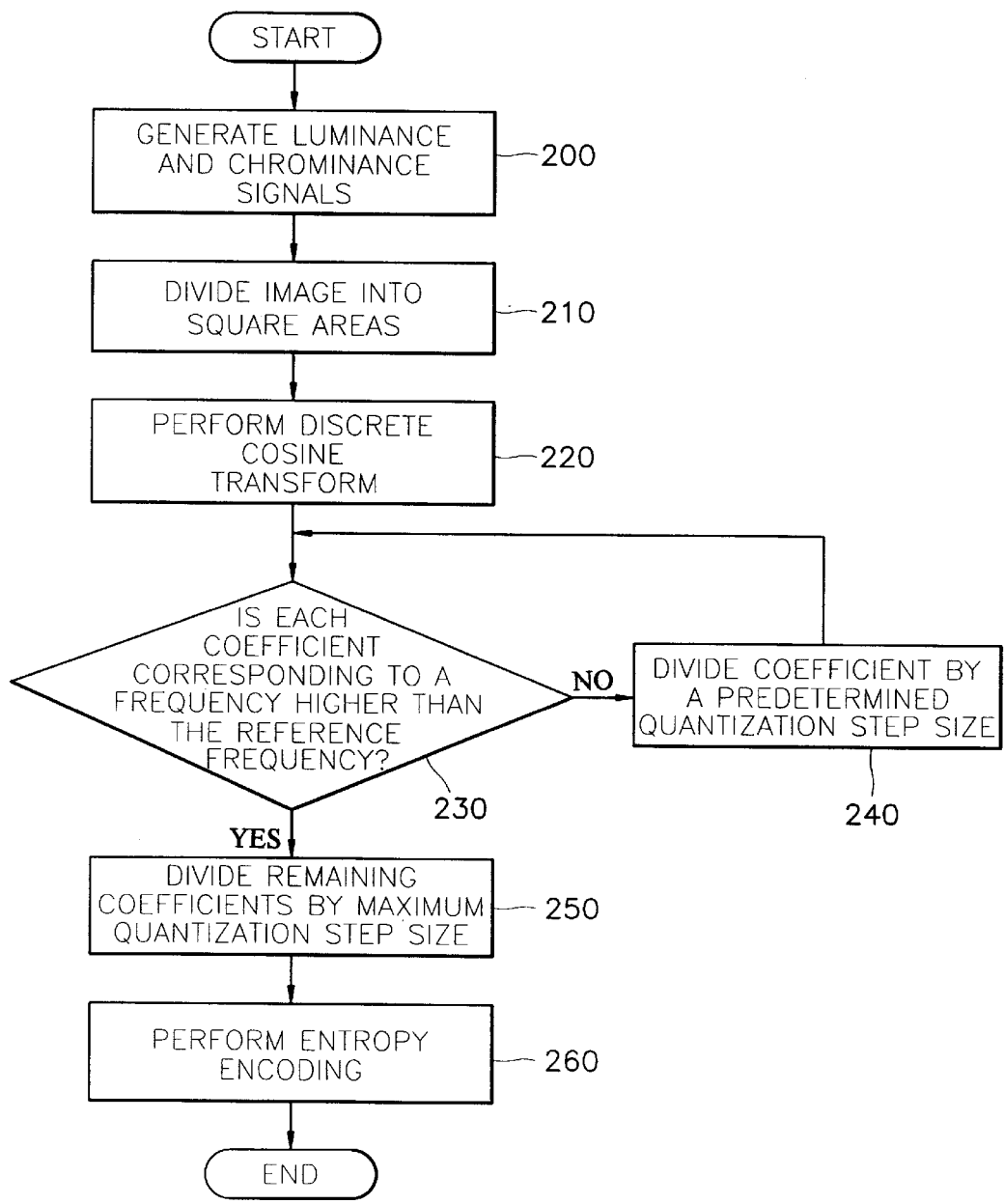
FIG. 2 is a flowchart outlining a process for constantly maintaining the compression rate in the still image compressing apparatus according to the present invention.

Referring to FIG. 2, the luminance and chrominance signal generator 100 generates a luminance signal and chrominance signals from R, G and B signals of an input still image, in step 200. Next, the discrete cosine transformer 110 divides the image of a screen, represented by the luminance and chrominance signals, into square areas of a predetermined size, in step 210. The discrete cosine transformer 110 discrete-cosine transforms each square area into coefficients for all the frequencies ranging from a mean value of the area to a maximum frequency image component, in step 230. Then, the coefficients corresponding to each discrete-cosine transformed frequency is inspected in sequence from low frequency to high frequency, in step 230. Coefficients of frequencies lower than the reference frequency are divided by a predetermined quantization step size in step 240. On the other hand, remaining coefficients of frequencies higher than the reference frequency are divided by a maximum possible value among the quantization step sizes in step 250. Thereafter, the image signal is compressed by allotting short-length codes to values having a high probability of occurrence, among the quantized coefficients, and long-length codes to values having a low probability of occurrence, in entropy encoding step 260.

According to the present invention, the compression rate is almost constantly maintained even though the content of an input still image varies. Therefore, in an apparatus in which image quality is of less importance but compressing or decompressing time should be predicted, the processing time can be predicted.

What is claimed is:

1. A still image compressing apparatus which constantly maintains a compression rate, said apparatus comprising:

a luminance and chrominance signal generator which receives R, G and B signals of a still image and generates luminance and chrominance signals;

a discrete cosine transformer which divides the still image, represented by the luminance and chrominance signals, into square areas of a predetermined size, and decomposes each of said square areas into coefficients for all frequencies ranging from a mean value to a maximum frequency image component;

a regular compression rate quantizer which divides each of said coefficients corresponding to frequencies lower than a reference frequency by a predetermined quantization step size, and divides each of said coefficients corresponding to frequencies higher than said reference frequency by a maximum quantization step size, thereby obtaining quantized coefficients; and an entropy encoder having a code scheme for allotting short-length codes to values of said quantized coefficients having a high probability of occurrence, and long-length codes to values of said quantized coefficients having a low probability of occurrence.

2. A method for constantly maintaining a compression rate, comprising the steps of:

receiving R, G and B signals of a still image and generating luminance and chrominance signals;

dividing the still image, represented by the luminance and chrominance signals, into square areas of a predetermined size;

discrete-cosine transforming each square area into coefficients for all frequencies ranging from a mean value to a maximum frequency image component;

dividing each of said coefficients corresponding to frequencies lower than a reference frequency by a predetermined quantization step size to obtain quantized coefficients;

dividing each of said coefficients corresponding to frequencies higher than said reference frequency by a maximum quantization step size to obtain further quantized coefficients; and entropy encoding the quantized coefficients and the further quantized coefficients.

3. The method as set forth in claim 2, said step of entropy encoding comprising the steps of:

allotting short-length codes to values of the quantized coefficients having a high probability of occurrence; and allotting long-length codes to values of the quantized coefficients having a low probability of occurrence.

4. A method for constantly maintaining a compression rate, comprising the steps of:

transforming color image signals into a luminance signal and two chrominance signals;

partitioning said luminance and chrominance signals into square blocks of a predetermined size;

discrete-cosine transforming each of said square blocks into coefficients ranging from a mean frequency value to a maximum frequency value;

producing quantized coefficients by dividing each of said coefficients having a frequency value lower than a reference frequency value by a predetermined quantization step size, and dividing each of said coefficients having a frequency value higher than said reference frequency value by a maximum quantization step size; and entropy encoding said quantized coefficients.

5. The method as set forth in claim 4, said step of entropy encoding comprising the steps of:

allotting short-length codes to values of the quantized coefficients having a high probability of occurrence; and allotting long-length codes to values of the quantized coefficients having a low probability of occurrence.

6. A still image compressing apparatus which constantly maintains a compression rate, said apparatus comprising:

luminance and chrominance signal generator means for receiving R, G and B signals of a still image and for generating luminance and chrominance signals;

discrete cosine transformer means for dividing the still image, represented by the luminance and chrominance signals, into square areas of a predetermined size, and for decomposing each of said square areas into coefficients for all frequencies ranging from a mean value to a maximum frequency image component;

regular compression rate quantizer means directly connected to said discrete cosine transformer means for dividing each of said coefficients corresponding to frequencies lower than a reference frequency by a predetermined quantization step size, and for dividing each of said coefficients corresponding to frequencies higher than said reference frequency by a maximum quantization step size, thereby obtaining quantized coefficients; and entropy encoder means having a code scheme for allotting short-length codes to values of said quantized coefficients having a high probability of occurrence, and long-length codes to values of said quantized coefficients having a low probability of occurrence.

7. A method for constantly maintaining a compression rate, comprising the steps of:

receiving R, G and B signals of a still image and generating luminance and chrominance signals;

dividing the still image, represented by the luminance and chrominance signals, into square areas of a predetermined size;

discrete-cosine transforming each square area into coefficients for a plurality of frequencies ranging from a mean value to a maximum frequency image component;

dividing each of said coefficients corresponding to frequencies lower than a reference frequency by a predetermined quantization step size;

dividing each of said coefficients corresponding to frequencies higher than said reference frequency by a maximum quantization step size; and entropy encoding the divided coefficients;

wherein said step of entropy encoding comprises the steps of allotting short-length codes to values of the divided coefficients having a high probability of occurrence, and allotting long-length codes to values of the divided coefficients having a low probability of occurrence.

8. A method for constantly maintaining a compression rate, comprising the steps of:

transforming color image signals into luminance and chrominance signals;

partitioning said luminance and chrominance signals into square blocks of a predetermined size;

discrete-cosine transforming each of said square blocks into coefficients for all frequencies ranging from a mean value to a maximum frequency image component;

producing quantized coefficients by dividing each of said coefficients having a frequency value lower than a reference frequency value by a predetermined quantization step size, and dividing each of said coefficients having a frequency value higher than said reference frequency value by a maximum quantization step size; and entropy encoding said quantized coefficients;

wherein said step of entropy encoding comprises the steps of allotting short-length codes to values of the quantized coefficients having a high probability of occurrence, and allotting long-length codes to values of the quantized coefficients having a low probability of occurrence.

9. The apparatus as set forth in claim 1, wherein a value of the reference frequency varies within a range of the compression rate which is to be constantly maintained.

10. The apparatus as set forth in claim 9, wherein variation of the compression rate decreases as the reference frequency is lowered and loss of image quality increases, and wherein variation of the compression rate increases as the reference frequency is increased and loss of image quality decreases.

11. The method as set forth in claim 2, wherein a value of the reference frequency varies within a range of the compression rate which is to be constantly maintained.

12. The method as set forth in claim 11, wherein variation of the compression rate decreases as the reference frequency is lowered and loss of image quality increases, and wherein variation of the compression rate increases as the reference frequency is increased and loss of image quality decreases.

13. The method as set forth in claim 4, wherein a value of the reference frequency varies within a range of the compression rate which is to be constantly maintained.

14. The method as set forth in claim 13, wherein variation of the compression rate decreases as the reference frequency is lowered and loss of image quality increases, and wherein variation of the compression rate increases as the reference frequency is increased and loss of image quality decreases.

15. The apparatus as set forth in claim 6, wherein a value of the reference frequency varies within a range of the compression rate which is to be constantly maintained.

16. The apparatus as set forth in claim 5, wherein variation of the compression rate decreases as the reference frequency is lowered and loss of image quality increases, and wherein variation of the compression rate increases as the reference frequency is increased and loss of image quality decreases.

17. The method as set forth in claim 7, wherein a value of the reference frequency varies within a range of the compression rate which is to be constantly maintained.

18. The method as set forth in claim 17, wherein variation of the compression rate decreases as the reference frequency is lowered and loss of image quality increases, and wherein variation of the compression rate increases as the reference frequency is increased and loss of image quality decreases.

19. The method as set forth in claim 8, wherein a value of the reference frequency varies within a range of the compression rate which is to be constantly maintained.

20. The method as set forth in claim 19, wherein variation of the compression rate decreases as the reference frequency is lowered and loss of image quality increases, and wherein variation of the compression rate increases as the reference frequency is increased and loss of image quality decreases.

* * * * *